No. 622,804. Patented Apr. 11, 1899.
H. H. HOSACK.
ROAD BREAKING MACHINERY.
(Application filed Dec. 28, 1897.)
(No Model.) 5 Sheets—Sheet 2.

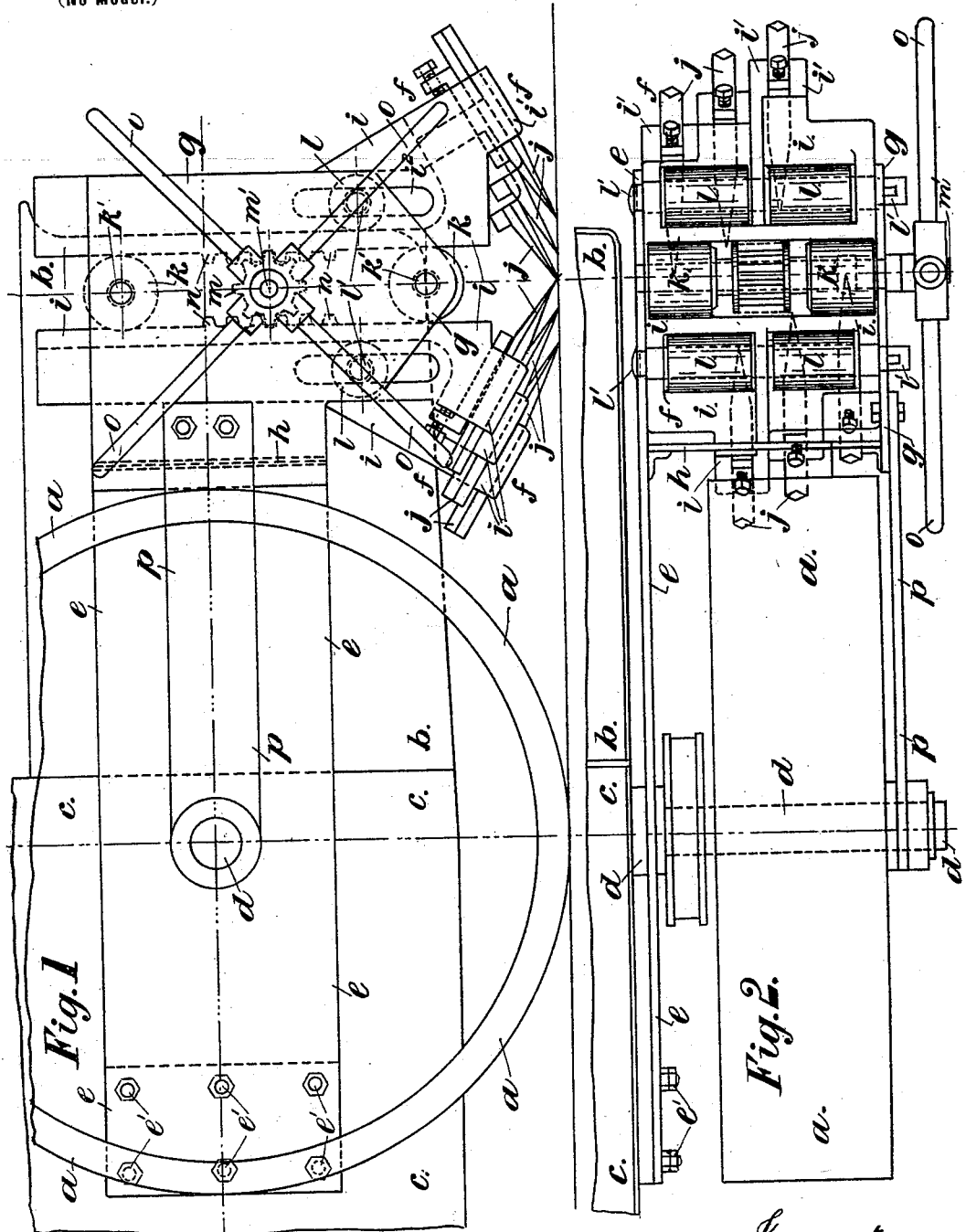

No. 622,804. Patented Apr. 11, 1899.
H. H. HOSACK.
ROAD BREAKING MACHINERY.
(Application filed Dec. 28, 1897.)
(No Model.) 5 Sheets—Sheet 3.
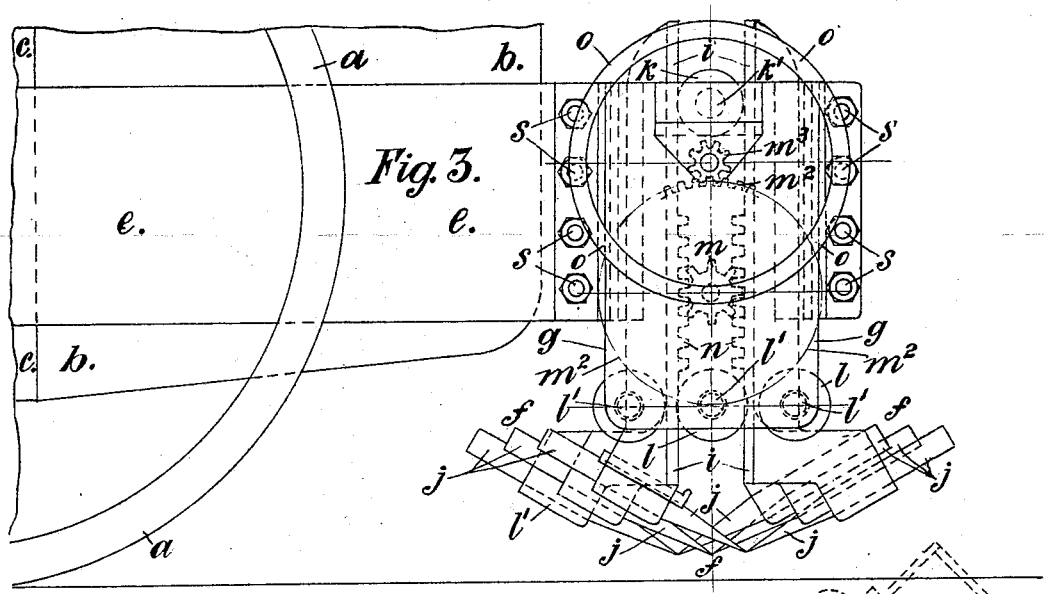
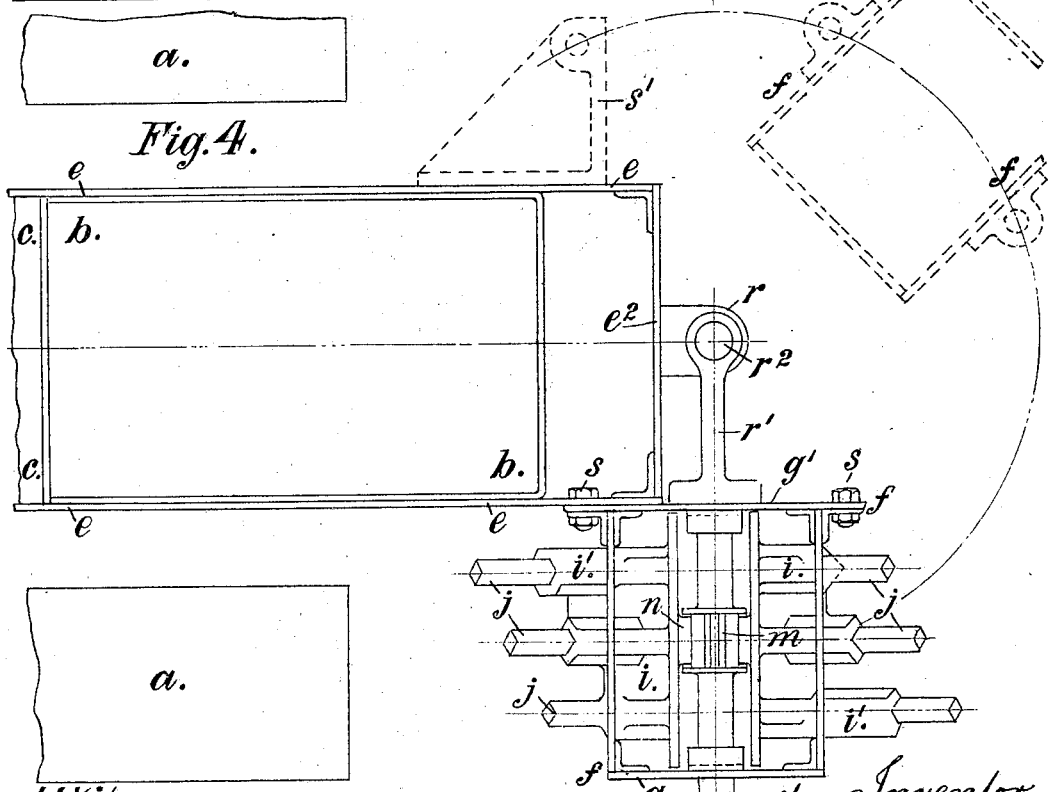
Witnesses.
E. R. Bolton
Inventor.
Harold Heron Hosack
By
his Attorneys No. 622,804. Patented Apr. 11, 1899.
H. H. HOSACK.
ROAD BREAKING MACHINERY.
(Application filed Dec. 28, 1897.)
(No Model.) 5 Sheets—Sheet 4.

Witnesses.

Inventor:
Harold Heron Hosack
By
his Attorneys.

No. 622,804. Patented Apr. 11, 1899.
H. H. HOSACK.
ROAD BREAKING MACHINERY.
(Application filed Dec. 28, 1897.)
(No Model.) 5 Sheets—Sheet 5.
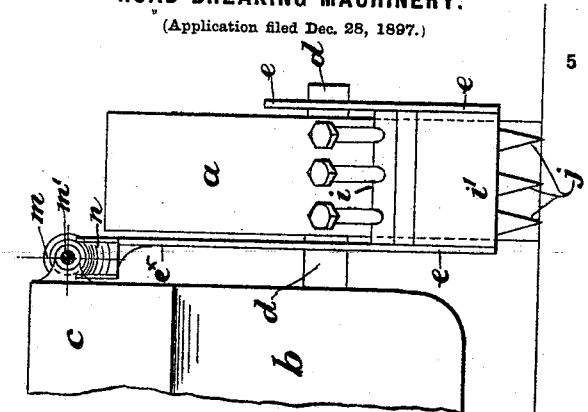
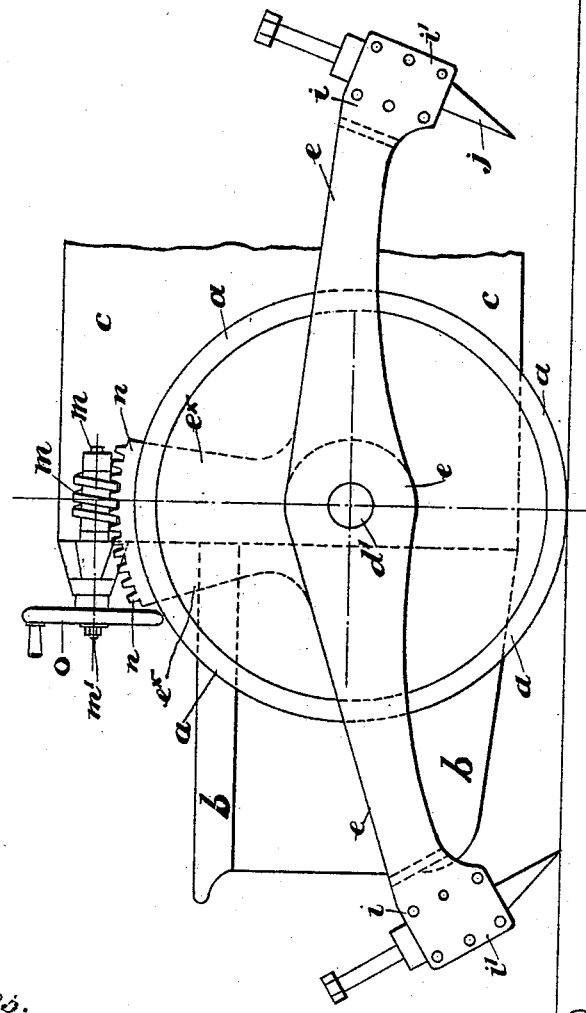
Witnesses.
Inventor.
Harold Heron Hosack
By his Attorneys

UNITED STATES PATENT OFFICE.

HAROLD HERON HOSACK, OF LONDON, ENGLAND.

ROAD-BREAKING MACHINERY.

SPECIFICATION forming part of Letters Patent No. 622,804, dated April 11, 1899.

Application filed December 28, 1897. Serial No. 664,006. (No model.)

*To all whom it may concern:*

Be it known that I, HAROLD HERON HOSACK, engineer, a subject of the Queen of Great Britain, residing at 15 Woodlands road, Barnes, London, England, have invented certain new and useful Improvements in Road-Breaking Machinery, of which the following is a specification.

This invention has reference to machinery or means for breaking up or scarifying the surfaces of macadam roads and analogous surfaces; and it relates more particularly to that class of such machines in which the breaking up or scarifying mechanism is carried on or forms part of a locomotive road-roller or traction-engine.

Drawings illustrative of this invention are hereto annexed, and the invention will be described in connection with them.

Figure 1:
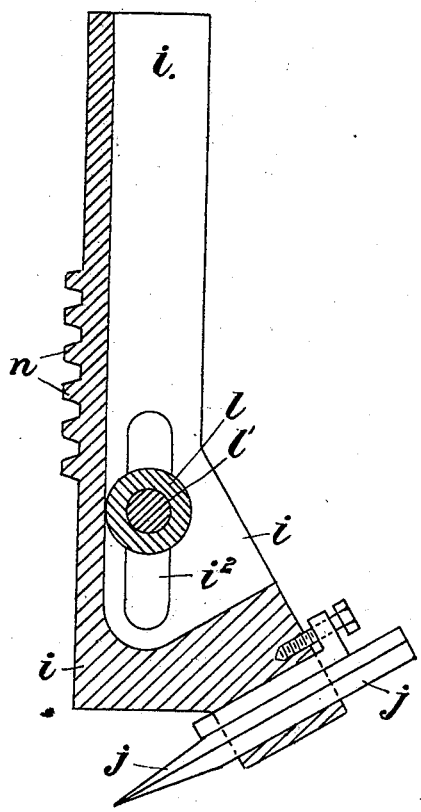
Figure 5:
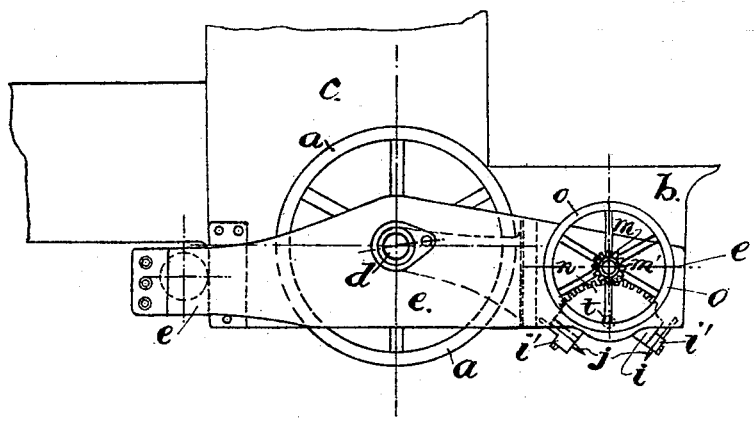

Figure 1 is a side elevation of one form of apparatus or construction under this invention, and Fig. 2 is a plan of same. Fig. 1$^A$ is a detail of the tool holder and rack. Fig. 3 is a side elevation, and Fig. 4 a plan, showing a modification wherein the apparatus illustrated in Figs. 1 and 2 is so constructed and arranged in relation to the road-roller that the breaking mechanism is adapted to be moved from one side of the roller to the other. Fig. 5 is a side elevation, and Fig. 6 a plan, showing another modification under the invention. Fig. 7 is a side elevation, and Fig. 8 an end view, showing another modification wherein the breaking mechanism is adapted to be moved from one side of the road-roller to the other. Fig. 9 is a side elevation, and Fig. 10 is an end view, of same, showing another modification.

Referring to the drawings, $a$ represents the road-wheel of a traction-engine or road-roller of the ordinary type.

$b$ represents the tender or tank portion of the engine, which is provided and fastened, as usual, to the fire-box of the roller or engine.

$c$ represents the fire-box portion of the boiler of the machinery.

$d$ is the axle and parts connected with it, on which the road-wheels $a$ are mounted.

$e$ is the frame on which the breaking mechanism hereinafter described is carried, and $f$ generally designates the breaking mechanism.

The frame $e$ (shown in Figs. 1 and 2) consists of a plate fastened by bolts at $e'$ to the sides of the fire-box $c$ and extending along parallel with the side of the weight or roller to the back of the tender $b$, where it is carried downward similarly to the plate, hereinafter described, of the breaking mechanism, forming the front side plate thereof. At the part of the frame $e$ where the axle structure $d$ comes the frame is perforated and surrounds this part of the axle and rests upon it. Thus the frame is supported at one point at its forward end to the fire-box plate and at a second point by the axle portion $d$ of the engine road-wheel.

The frame of the breaking mechanism consists of the rear end of the frame $e$, a plate $g$, forming the front side plate thereof, above referred to, and a connecting end plate $h$, secured to the plates $e$ and $g$. In this framing the tool-holders are carried. These consist in the case shown of vertical channel-shaped parts $i$, one on either side of the center of the mechanism and extending from the upper part to the lower part, where they are provided with strong blocks or heads $i'$, having holes through them and serving as the tool-holding parts proper of the mechanism. The tools (designated $j$) pass diagonally through these parts $i'$, being suitably fastened therein by cotters or other means, and they are disposed in echelon arrangement, with their points facing each other, and being arranged in the two tool-holders in the relative dispositions shown. These tool-holders $i$ are supported in their relative position horizontally—that is, in the direction of the motion of the engine or roller—by the upper and lower rollers $k$, which come between the tool-holders $i$ and rollers $l$ at the lower part of the apparatus, which fit within the outside flanges of the tool-holders $i$, the rollers $k$ and $l$ being fixed by shafts $k'$ and $l'$, respectively, in the frame $e$ and front plate $g$. At the points where the shafts $l'$ pass through the sides of the tool-holders $i$ such tool-holders are provided with slots $i^2$ to allow of upward and downward movement.

The position of the tool-holders and tools vertically is controlled by and the tool-holders counterbalance each other through the toothed wheel $m$, carried by the frames $e$ and $g$ by a spindle $m'$, and a rack $n$ on the inner face of each of the tool-holders $i$, with which the teeth of the wheel $m$ mesh. The wheel $m$ is operated by the arm-wheel $o$, fixed on the shaft $m'$. Thus the wheel $m$ both actuates the two tool-holders in opposite directions, so as to move one set of tools down and move the other up simultaneously, and also at the same time supports them vertically. By the arrangement also of the tool-holders in connection with the wheel $m$ a complete balancing of the apparatus is effected, rendering at the same time the power required to adjust or operate the mechanism very small.

The support to the breaking mechanism against wringing and bending offered by the frame $e$ is supplemented by a bar $p$, fastened to and extending between the outer end of the axle $d$ of the road-wheel $a$ and the plate $g$ of the breaking mechanism.

Referring now to the modification shown in Figs. 3 and 4, the breaking mechanism $f$ is adapted to be moved to one or other side of the road-roller or traction-engine. In this case there is a frame $e$ on either side of the engine, which extends beyond the tender $b$ and the ends of which are coupled together by a plate $e^2$. This plate carries a vertical pivot-bearing $r$, to which the inside plate $g'$ of the mechanism $f$ is connected by a hinged carrier $r'$, which is connected with $r$ by a pin $r^2$. The mechanism $f$ is secured to the frame $e$ by the bolts $s$, which pass through the frame $e$ and the projecting edge of the inside plate $g'$ of the breaking mechanism. As a modified means of connecting the frame $e$ with the mechanism $f$ a bracket $s'$ (shown in dotted lines on the upper part of Fig. 4) might be used and the frame of the mechanism $f$ would be connected to this bracket by a pin passing through an eye on such bracket end and an eye on the mechanism-frame, as shown in dotted lines. The tool-holders $i$ in this case are supported by rollers $k$ and $l$, similarly as the apparatus shown in Figs. 1 and 2, and they slide or move up and down in the same manner as in that arrangement. The gear for operating the toothed wheel $m$ and the tool-holders in this case is shown to consist of a large spur-wheel $m^2$ of the shaft $m'$, a small toothed pinion $m^3$ meshing with $m^2$ and fixed upon a separate shaft supported on the frame and having also fixed upon it the hand actuating-wheel $o$.

In the operation of changing mechanism $f$ from one side to the other of the engine it is merely necessary to disconnect the fastening connecting that mechanism with the frame $e$ on the one side, swing the whole mechanism about the pivot-pin $r^2$ to the other side of the machine, and then fasten the mechanism to the opposite member of the frame $e$ on that side of the machine. By this changing across of the breaking mechanism both sides of the road can be broken up quite up to the edges without having to turn the engine around.

Figure 6:
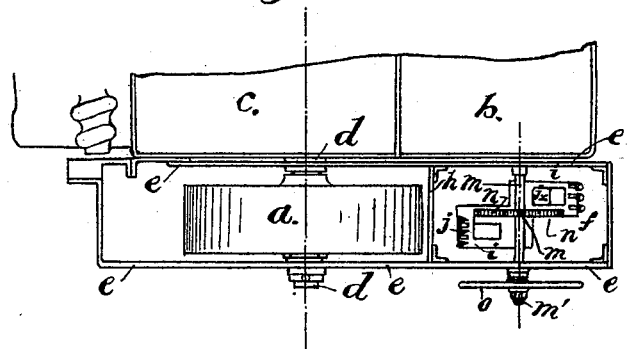
Figure 7:
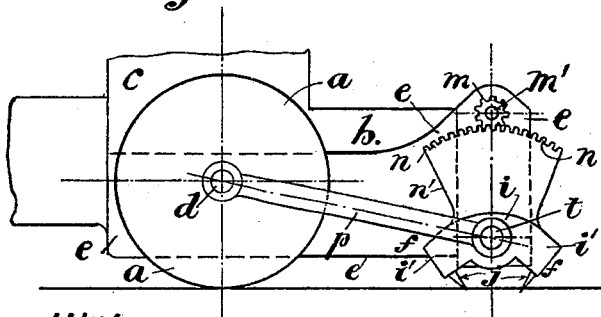

In the modification shown in Figs. 5 and 6 the frame is of duplex form—that is to say, there is a frame $e$ next the fire-box and tender, as in Figs. 1 and 2, and one outside the wheel $a$, while the breaking mechanism is disposed within and carried directly by these frames behind the wheel $a$. The front part of the outer frame $e$ is carried forward and around the road-wheel $a$, as shown, (or up to and passed over the end of the axle $d$, as shown in dotted lines,) and this outer frame or plate $e$ is supported by the wheel-axle $d$ as well as the inner frame. The tool-holders $i$ shown in this case consist of a rocking device comprising metal blocks supported upon a shaft $t$, supported at its ends by the frames $e$. The tool-holders $i$ are in duplex arrangement, as shown, one being on either side of the frame, and they are provided with a quadrantal toothed rack $n$ at the center, with which engages a spur-wheel $m$, mounted upon a shaft $m'$ and operated by the hand-wheel $e$. By means of this hand-wheel and toothed mechanism the blocks or holders $i$ are rocked upon their supporting-shaft $p$ and one or other of the sets of tools $j$ are brought into action, according to whether the engine is going forward or backward.

Figure 8:
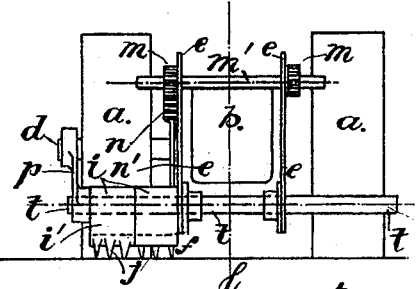

Referring to the modification shown in Figs. 7 and 8, in which breaking mechanism is adapted to be used on one side or other of the roller, the frame-plate $e$ in this case is arranged on either side of the fire-box and tender of the machine, being supported by the axles $d$ of the road-wheel and extending beyond the end of the tender. At this end of the frames two shafts $t$ and $m'$ are carried across from side to side of the machine, the lower shaft $t$ being that which carries the tool-holder $i$. In the example shown the tool-holder is of the kind shown in Figs. 5 and 6 and is provided with a quadrantal rack $n$, carried upon the plate $n'$, through which, by means of the toothed wheel $m$ on the operating-shaft $m'$, one or other of the sets of tools is brought into the active position in relation to the road. A connecting-bar $p$ is also shown used in this case connecting the end of the shaft $t$ with the outer end of the road-wheel axle $d$. When the tool-holder is to be shifted from one side of the engine to the other, this connecting-bar $p$ is removed. Then the holder or block $i$ can be taken off the end of the shaft $t$ and placed on the opposite end of this shaft, projecting beyond the frame $e$ at the other side of the machine. When this is done, the connecting-bar $p$ is placed in position, connecting the axle $d$ at that side with the shaft $t$.

In the modification shown in Figs. 9 and 10 the frame $e$ (which in the case illustrated is of double form) is supported by the axle $d$ of the road-wheel, and at one side the frame is carried up at $e^x$ and is provided at its upper edge with a quadrantal rack $n$, with which meshes a worm $m$. This worm is firmly mounted on the engine or roller and takes the thrust or stress on the frame at that end, which is caused by the pressure tending to press the tools out of the macadam or material which they are working in, and it also at the same time, through the hand operating-wheel o, serves to move one or other of the tool-holders i and tools therein (which are carried directly on the ends of the frames e) into or out of position.

What is claimed in respect of the herein-described invention is—

1. In combination with the engine and its roller, and a tool-holder with means for supporting the same at either side of the machine when shifted and in line with the roller, substantially as described.

2. In combination, the engine, the frame, the roller and a swinging support carrying tools and adapted to hold the same on one side of the machine or the other, substantially as described.

3. Road-breaking machinery, comprising the combination, with the engine-body c and road-wheel a, of the frame e connected to and supported by same, and extending along the side of same to a point beyond the periphery of said road-wheel a, and carrying at this point the tool-holder i' and two sets of tools j, and means connected with same for simultaneously raising one set of tools and lowering the other; substantially as set forth.

In testimony whereof I have hereunto set my hand in presence of two subscribing witnesses.

HAROLD HERON HOSACK.

Witnesses:
DUNCAN C. BERWICK,
DOUGLAS G. BENNETT.